(No Model.)
W. P. THOMPSON.
Fluid Pressure Brake.
No. 238,619. Patented March 8, 1881.
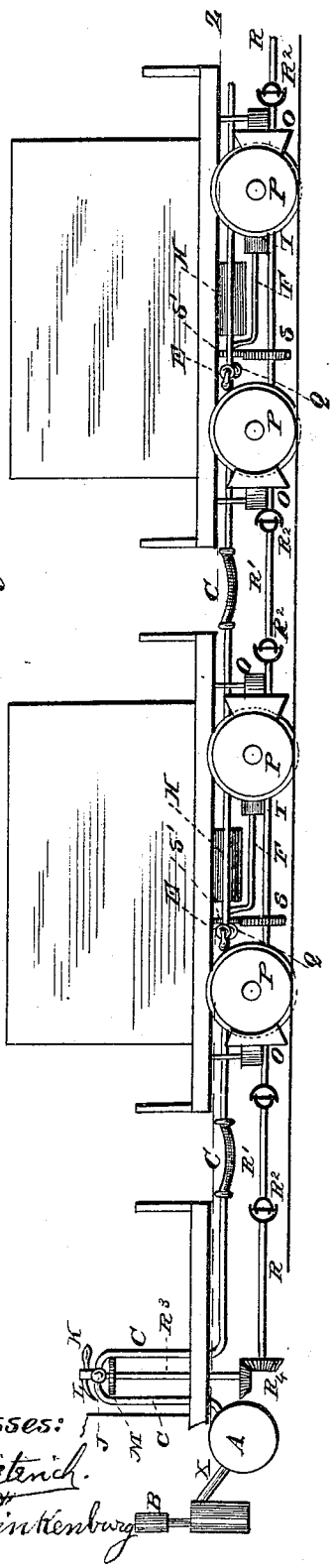
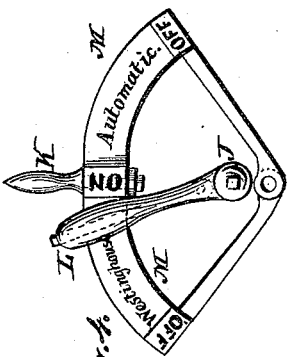
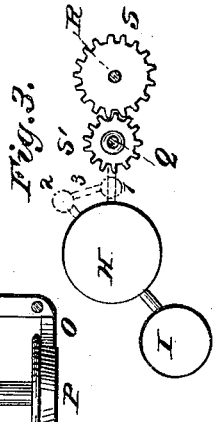
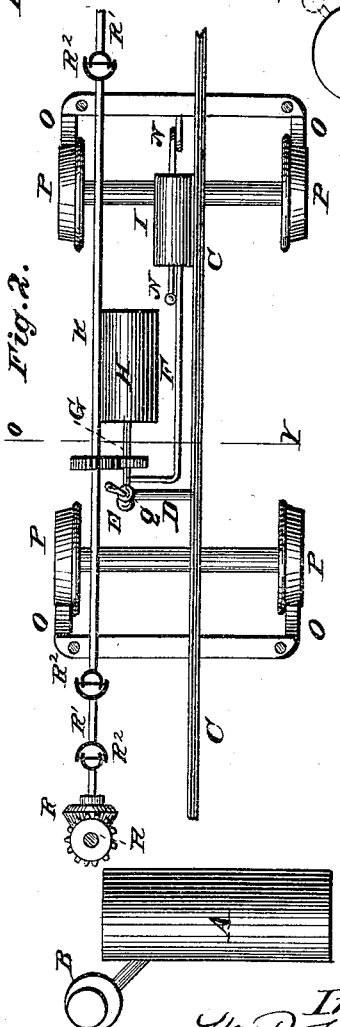
Witnesses:
P. C. Dietrich
Geo Binkenburg
Inventor:
Wm P. Thompson
per Lloyd Wigand Atty.
N. PETERS, PHOTO-LITHOGRAPHER, WASHINGTON, D. C.

UNITED STATES PATENT OFFICE.

WILLIAM P. THOMPSON, OF PHILADELPHIA, PENNSYLVANIA.

FLUID-PRESSURE BRAKE.

SPECIFICATION forming part of Letters Patent No. 238,619, dated March 8, 1881.

Application filed October 8, 1880. (No model.)

*To all whom it may concern:*

Be it known that I, WILLIAM P. THOMPSON, of the city and county of Philadelphia, and State of Pennsylvania, have invented a new and useful Improvement in Railway-Train Brakes; and I do hereby declare the following to be a sufficiently full, clear, and exact description thereof to enable others skilled in the art to make and use the said invention, reference being had to the drawings annexed and the letters of reference marked thereon.

The object of this invention is to further improve the brakes for retarding and stopping the motion of railway-trains by the prevailing devices, constituting a safety apparatus by means of which the engineer may, at his option, instantly and completely, from his station on the locomotive, change the system or mode of operating pneumatic or other fluid-pressure brakes from one system to another, or cut off the operating by power altogether, and allow them to be operated by the brakesmen through the hand-wheels and their connections.

The nature of this invention consists in a series of cocks or valves controlling the flow of air or fluid pressure from the main pipe, which extends back under the cars of the train, which valves are provided and operated with mechanisms hereinafter described, and which are continued through under each car of the train to the engine, where, by the moving of a lever, all these cocks or valves may be moved simultaneously in the desired direction, and where also they are connected to a dial having certain marks, which, being, at the motion of said lever, brought into juxtaposition with the lever of the air-cock of the main pipe, will indicate in which direction the lever of the air-cock must be moved to effect the putting on or off of the brakes.

Figure 1 in the drawings represents a side elevation of this invention applied to the usual air-brake apparatus. Fig. 2 is a plan view, in section, on the dotted line X Z in Fig. 1. Fig. 3 is a sectional elevation on the dotted line O Y in Fig. 2. Fig. 4 is a plan view of the dial and lever on the locomotive.

The same letters of reference apply to the same parts in the several figures.

A represents the large air-tank or the locomotive; B, the pumps for compressing or supplying the same; C, a pipe leading from the tank A under the train, and provided under each car with branches D, leading to a valve, E, such as is known to engineers as an "automatic valve," from which valve E pipes F and G lead—the pipes F to the brake-operating cylinders I, and the pipes G to tanks or air-reservoirs H under each of the cars. The flow of air to the pipe C from the tank A is controlled by a valve in the engineer's cab, provided with a handle, K, and an index, L, moving over a dial, M, showing the positions of the brakes attending different adjustments of the valve J.

The brake system as just described is what is known to engineers as "automatic," and operates by the reaction or expansion of air previously compressed into the tanks H, closing the valve E from the supply-pipe C, and opening a communication through the pipes F and G between the tank H and the brake-operating cylinder I. The air in the tank G, expanding, forces the piston N outward in the cylinder I, and forces the brake-shoes O into close contact with the wheels P. The application of the brake-shoes is, with the automatic system, effected by the engineer moving the handle of the cock or valve J so as to interrupt the flow of air to the pipe C and permit the escape of air from the pipe C.

This improvement consists in the insertion of a valve or cock, Q, in each pipe D, which, when turned in one direction, shuts off communication from the pipe C to the valves E and opens a communication between the pipe C and the brake-operating cylinders. The most convenient and simplest form for this valve is a three-way cock, although other forms of valve may be substituted. These valves Q are susceptible of being operated simultaneously by means of shaft R, extending under the train and provided with automatically-engaging couplings R' and universal joints R², so as to render the said shaft R so flexible as to adapt it to passing curves and oscillations of the cars upon their springs. Each of the cocks or valves Q is connected most conveniently by pairs of toothed wheels or sectors S and S' to the shaft R, and the shaft R is turned by the engineer by means of a shaft, R³, connected with the shaft R by a pair of beveled wheels, R⁴. Upon the shaft R is a lever, K, which turns it, and also a dial, M, which turns under the index L of the valve J, so that the engineer can instantly read in what adjustment the brakes are in every position in which the handles R⁵ and the handle of the valve J may be placed.

The index L is preferably made elastic, to trail over indentations and raised portions or marks formed on the dial M, which, by their sound and the feeling or touch of the engineer in operating them, apprise him of the position of the brake mechanism.

By the use of this device, when it is found that there is a deficiency of pressure in the tanks H under the cars to operate the automatic brake, the direct pressure of air from the tank A is instantly available to work them, and the instantaneous cutting off of the small reservoirs renders the compressed air in the tank A more effective for pressure upon the brake-pistons than it would be if the pressure had to be equalized also in the small reservoirs, as they would not only absorb part of the pressure, but make the time longer in which the equalization of pressure would take place.

Instead of the shaft and gear-wheels, pistons 1 and cylinders 2, and a pipe, 3, transmitting fluid-pressure, may be substituted for turning the cocks Q, as is shown in Fig. 3 in dotted lines.

Having described my invention, what I claim is—

1. In a system of railway-brakes operated by fluid-pressure controlled by the engineer, a safety system of operating devices by means of which the engineer can at his option, while on the engine, change the connection of the brake-operating cylinders from a communication with the pressure-reservoirs on the several cars to a direct communication with pressure-reservoir on the engine, all arranged substantially as and for the purpose set forth.

2. In combination, a safety system of brake-operating devices susceptible of alternative use, at the option of and by the engineer, and a reversible movable dial and index indicating to the engineer in the cab the adjustment of the brake mechanism, all arranged as and for the purpose set forth.

3. In combination with a safety system of brake-operating devices, an index and dial having elevations and depressions thereon, whereby the engineer may, by the sense of touch, inform himself of the adjustment of the brake-operating mechanism.

WM. P. THOMPSON.

In presence of—
GEORGE REX. MAGEE,
J. DANIEL EBY.